United States Patent

[11] 3,581,554

| [72] | Inventors | Rene LaFitte;<br>Paul LeCarpentier, both of Caen Calvados, France |
|---|---|---|
| [21] | Appl. No. | 826,222 |
| [22] | Filed | May 20, 1969 |
| [45] | Patented | June 1, 1971 |
| [73] | Assignee | U. S. Philips Corporation<br>New York, N.Y. |
| [32] | Priority | May 22, 1968 |
| [33] | | France |
| [31] | | 152777 |

[54] DEVICE FOR IDENTIFYING CONDENSATION DEPOSITS
7 Claims, 1 Drawing Fig.

[52] U.S. Cl. ................................................ 73/17, 73/23
[51] Int. Cl. ................................................ G01n 25/02
[50] Field of Search ........................................ 73/17; 23/230, 232, 254

[56] References Cited
UNITED STATES PATENTS

| 2,591,084 | 4/1952 | Martin | 73/17 |
| 3,060,318 | 10/1962 | Olivrard | 73/17 |
| 3,367,171 | 2/1968 | Kobayashi | 73/17 |

Primary Examiner—James J. Gill
Assistant Examiner—Herbert Goldstein
Attorney—Frank R. Trifari ABSTRACT: A device for identifying condensation deposits by the measurement of phase transition temperature of deposits on a polished surface having a controllable temperature inside a space traversed by the gas containing the element to be identified. A chamber to contain the gas is formed by the polished surface, a transparent surface arranged parallel to the polished surface and the inner wall of a ring located between the surfaces, means are provided for measuring the temperature of the polished surface so as to determine the transition temperature.

PATENTED JUN 1 1971
3,581,554
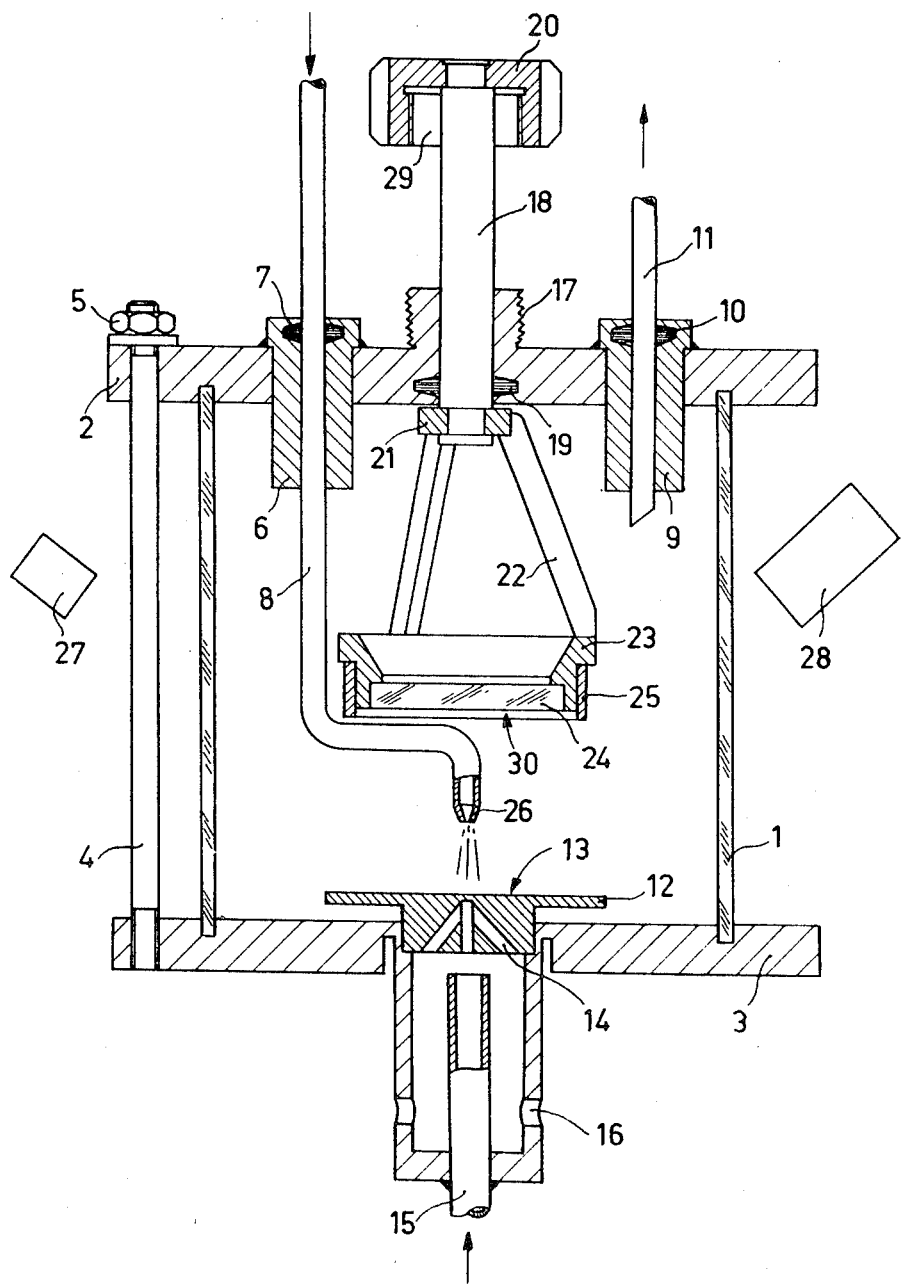
INVENTOR.
RENÉ LAFITTE
PAUL LE CARPENTIER
BY
AGENT

DEVICE FOR IDENTIFYING CONDENSATION DEPOSITS

This invention relates to a device for identifying condensation deposits by the measurement of phase transition temperatures of deposits on a polished surface having a controllable temperature inside a space traversed by the gas containing the element to be identified.

The analysis of gaseous impurities contained sometimes as traces, in a so-called pure gas requires the use of methods of very high sensitivity. Such an analysis usually comprises a first step of concentrating the impurities, then a separation of the various impurities. The latter operation may be carried out by gas chromatography, by fractionated condensation, by fractionated evaporation. If the nature of the impurities to be analyzed is not known, this method does not permit identification of them. In fact, the phenomena of condensation and evaporation as well as of adsorption and diffusion and so on are functions not only of the temperature but also to the partial pressure of the element to be analyzed contained in the gas under examination.

The measurement of the condensation temperature, the dew point, for instance, does not allow identification of the element.

A study by spectrophotometry may be carried out, but the identification is hazardous and the required apparatus is highly complicated.

There are furthermore known devices intended for measuring the content of humidity of an atmosphere or a gas by measuring the dew point, which devices may sometimes be capable of determining a dew point of another constituent than the water vapor. In these devices the gas is directed to a polished surface held at a low temperature, which decreases in time, until a condensate is deposited. With very low contents of water vapor or other gaseous impurities the condensation is produced at a temperature lower than that of the triple point of the phase diagram of the element and the condensates directly crystalize. The phenomenon of sublimation obtained by a gradual increase of the temperature, like that of condensation, cannot provide information about the concentration of the impurity or about the nature of the condensate, if the element is not known.

The object of the invention is to provide a means for identifying a constituent of a gas mixture by the measurement of the temperature of a phase transition independent of the partial pressure of this constituent. The passage from the solid state to the liquid state and the passage from the liquid state to the solid state do not depend upon the partial pressure. The accurate temperatures of these phenomena are also well known for practically all known pure elements. In order to produce these transitions of state from a deposit of a condensate in the solid state it is necessary to create conditions for this deposit which correspond to a point of its phase diagram located above the triple point and for this purpose the resultant gas phase has to be at a pressure exceeding that corresponding to the triple point.

The invention utilizes this feature and for this purpose the device in accordance with the invention comprises means for producing a condensation deposit to be captured in a minimum volume, the temperature thereof being varied and measured.

In order to produce a condensation deposit, which is clearly visible, it is necessary to direct the gas containing the vapor to be identified to a polished surface, the temperature of which is adequately lowered. It is, however, important to have a satisfactory deposition in order to reduce the duration of the operation and to obtain a maximum quantity of deposit. Applicant has found that in order to improve the deposition efficiency it is necessary to direct the gas to the polished surface with sufficient speed to create turbulence in the vicinity of said surface, on which the maximum temperature gradient has to be obtained so that gas layers having temperatures near the condensation point are eliminated as far as possible, in which a gaseous condensate might be formed and be carried along by the gas without being precipitated.

According to the present invention a device for identifying condensation deposits by the measurement of the phase transition temperatures of said deposits observed on a polished surface of known, controllable temperature inside a space traversed by the gas containing the element to be identified is mainly characterized in that said space accommodates on the one hand a sealed chamber of small size, bounded by said surface, a second surface parallel to the former and being transparent and by the inner wall of a ring joining said surfaces and on the other hand means for opening and closing said chamber by moving said surfaces away from and towards each other. A gas supply duct is provided for directing the gas with high speed to said polished surface.

The device, in accordance with the invention, comprises only simple members which do not require critical techniques. The manipulation is easy, although the chamber is extremely small, the size being proportional to the thickness of said ring, which may be made as small as is desired. The phase transitions are quite distinct.

The speed of deposition and the efficiency are high and the device allows phase transitions of even a very small deposit produced by an impurity of extremely low content.

The device according to the invention is advantageously used in conjunction with the device disclosed in copending application ser. No. 826,223 of the applicant entitled "Method and Device for Analyzing Gases" for carrying out the method of said application.

In an advantageous embodiment of the device according to the invention a pressure-measuring and/or controlling member is connected with said chamber. This embodiment permits of a confirmation of the identification provided by the measurement of the temperature of the transition from the solid state to the liquid state, by simultaneous measurements of temperature and pressure during the transition from the liquid phase or the solid phase to the vapor state and conversely.

The device according to the invention comprises in addition means for measuring the temperature of the polished surface, means for cooling said surface and, as the case may be, means for illuminating and observing the condensates on said surface. Moreover, the ring joining said two surfaces is preferably of elastic material or of compressible material so that the distance between said surfaces may be reduced, if necessary to zero.

The following description given by way of example with reference to the accompanying drawing will show how the invention may be carried into effect, the features resulting from the drawings and the text forming of course part of said invention.

The sole FIGURE is a sectional view of a device in accordance with the invention.

The device shown comprises a glass cylinder 1 formed by two metal plates 2 and 3, the sealed assembly being fastened by the strips 4 held by screws 5, for example, three screws.

The plate 2 has two sleeves 6 and 9. The sleeve 6 having a stuffing washer 7 provides a gas supply channel 8; the sleeve 9 having a stuffing washer 10 provides a gas outlet channel 11. The sleeve 6 allows a rotation and a displacement of the tubing 8.

The plate 3 supports a platform 12 having a flat, polished surface 13. The platform 12 may consist of nickel- and/or chromium-plated copper. Passages 14 are provided in the bulk of the platform 12 for accommodating a thermoelement for measuring the temperature of the surface 13. The surface 13 is cooled by means of a flow of liquid nitrogen or gaseous nitrogen of low temperature supplied via the tubing 15 and conducted away through one of the holes 16. These holes also serve to pass the wires of the thermoelement (not shown).

The plate 2 has a screw-threaded extension 17 of fine pitch traversed by a rod 18 whose axis is normal to the surface 13, while a washer 19 provides a tight seal. The rod 18, terminating in a control-knob 20, is provided at the other end inside the space of the device with a ring 21, adapted to rotate freely and to support via arms 22 and a support 23 a transparent plate 24 of planoparallel surfaces extending parallel to the surface 13. Around the plate 24, usually of glass, is clamped a ring 25 of slightly elastic material, for example, polytetrafluorethylene. The plate 24 is mounted in an airtight manner in a support 23. The ring 25 has a very slight salient part of about 0.5 mm. around the plate 24 and is on the other side in contact with a shoulder of the support 23.

The tubing 8 for the gas supply is shaped so as to avoid the movable assembly comprising the plate 24 and its end is shaped in the form of a nozzle 26 directed towards the center of the surface 13.

The device may be completed by a light source 27 directed towards the surface 13 and an observation ocular 28 also directed towards the surface 13.

The knob 20 is provided with a screw thread 29 which cooperates screw thread 17 and the length of the movable assembly holding the transparent plate 24 is determined so that a few turns of the knob 20 are in mesh with the screw thread 17 before the ring 25 can come into contact with the surface 13, in which case the tubing is released by rotation in the sleeve 6. Thus by turning the knob 20 on the tapped extension 17 the ring 25 is progressively compressed so that simultaneously the plate 24 is moved towards the platform 12, the volume between their opposite surfaces 30 and 13 being proportionally reduced.

As a matter of fact the various members of the device according to the invention may be shaped in forms differing from those described above. For example, the plate 24 may be replaced by a planoconvex lens; the surface 13 may be concave or convex and the opposite face 30 of the plate 24, which is parallel thereto, may therefore be convex or concave. The cooling of the surface 13 may be carried out by any known method or arrangement. The channel 8 or the channel 11 may be provided with a flow meter.

In order to avoid condensation deposits beyond the surface 12 it is advantageous to provide a minimum thermal conduction between the platform 12 and the plate 3, while the latter may be heated, for example by means of a coated resistor arranged beneath the plate or embedded therein. The deposit on the tubing 1 may be advantageously eliminated by means of an external jet of hot air or air of ambient temperature.

When placing the device, according to the invention, in operation, first the space has to be cleaned, while the inner chamber in the ring 24 is open and the assembly supporting the transparent plate is in the highest position. Cleaning is preferably performed by means of the same gas as the transporting gas of the vapor to be identified. Then a given flow for the condensation is maintained and the surface 13 is brought to its temperature.

If the gas so far used does not already contain the vapor to be identified, the latter is introduced into the space of the device by means of the transporting gas. This applies, for example, to the case in which the device according to the invention is employed for analyzing impurities in a gas by the method forming the subject-matter of the aforesaid U.S. application Ser. No. 826,223.

In order to obtain optimum condensation the temperature of the surface 13 is brought progressively to a very low value and the nozzle 26 is arranged so that above the surface 13 a maximum gradient is obtained. For example, the surface 13 is brought to −180°C. and the orifice of the nozzle 26 has a diameter of 0.5 mm. and is arranged at 20 mms. above the surface 13, while it supplies a flow of 0.1 litre/min of nitrogen containing an impurity whose concentration has previously been strongly increased.

Said impurity is deposited in the form of small crystals forming a kind of easily distinguished dew. When this dew is sufficiently distinct or when the whole quantity of previously concentrated impurity has been transferred in this way, the tubing 8 is detached to permit the rod 18 to be lowered, the plate 24 and the plate 12 being moved towards each other. The dew is enclosed between the two opposite surfaces 13 and 30 and the ring 25. By screwing the knob 20 on the extension 17, the surface 30 is moved to a distance from the surface 13 of the order of 0.1 mm. The temperature of the surface 13 is then progressively raised. The resultant vapor remains enclosed in the airtight chamber and its saturation pressure increases progressively to a value higher than that corresponding to the triple point of the phase diagram of the element concerned: the liquid phase may be obtained. The melting temperature is marked at the passage and permits of identifying the condensed element.

At a further rise of temperature the condensate rapidly evaporates at a temperature which in itself would not permit of identifying the condensate, since it depends upon the vapor pressure prevailing inside the chamber, but it provides an approximate value of the boiling temperature. Therefore, this measure permits in most cases to confirm the first identification or to render it more precise in the case of an option between elements having approximately equal melting temperatures.

This measurement of evaporation temperature is rendered more accurate and may be determinating by using a device according to the invention in its embodiment comprising pressure measuring or controlling means in the chamber formed by the condensation surface 13 the parallel, opposite surface 30 and the ring 25.

For example, a calibrated valve is arranged in a channel passing through the support 23 and opening out in said chamber. Preferably a manometer, for example, a U-shaped tube provided with mercury is connected with a channel opening out in said chamber. The channel provided with the calibrated valve or opening out in the mercury of the manometer forms a parasitic volume so that a minimum inner diameter is desirable.

In this variant the device according to the invention permits of measuring an evaporation temperature as well as the pressure at which evaporation occurs. The knowledge of the vapor pressure curves of the various possible elements as a function of temperature permits the identification as a confirmation of that resulting from the measurement of the melting temperature.

As a matter of course, modifications may be applied to the aforesaid embodiments by using other, equivalent technical means within the scope of the present invention.

We claim:

1. A device for identifying condensates deposited on a polished surface by measuring phase transition temperatures inside a space traversed by the gas containing the element to be identified, comprised by said space having formed therein a sealed chamber of small volume, which is bounded by said surface, a second transparent surface parallel to the former and the inner wall of a ring arranged between said surfaces, means provided for opening and closing said chamber by moving said surfaces away from each other or towards each other respectively, a supply duct for directing said gas with high speed to said polished surface, means to measure the temperature of the polished surface, means to control the temperature of the polished surface including means to cool the gas to thereby produce condensation of the element to be identified, and means to raise the temperature of the polished surface and thereby cause said element to pass through a phase transition, whereby when said gas carrying the elements to be identified is introduced into said chamber, so that said gas is cooled by said polished surface and the condensate formed thereon, thereafter said chamber will be closed and the temperature raised so that the phase transition temperature will be noted so identification of said element may be made 2. A device for identifying precipitated condensates as claimed in claim 1 comprising pressure measuring members in said chamber and wherein said means for measuring the temperature of the polished surface comprises a thermoelement provided in the immediate vicinity of the polished surface in a metal support of said surface.

3. A device as claimed in claim 1 further comprising a coolant duct directed to the metal support of the polished surface for cooling said surface and a light source for illuminating the polished surface.

4. A device as claimed in claim 1 further comprising an optical observation system orientated towards the polished surface.

5. A device as claimed in claim 1 wherein the ring is made of elastic material, particularly polytetrafluorethylene.

6. A device as claimed in claim 1 wherein the second transparent surface is formed by the surface of a planoparallel glass plate or by the flat surface of a planoconvex lens.

7. A device as claimed in claim 1 wherein the inner volume of the chamber is adjustable by means of a fine-pitch screwing system.